(12) United States Patent
Nagahama et al.

(10) Patent No.: US 10,663,629 B2
(45) Date of Patent: May 26, 2020

(54) VARIABLE FOCAL LENGTH LENS APPARATUS

(71) Applicant: MITUTOYO CORPORATION, Kanagawa (JP)

(72) Inventors: Tatsuya Nagahama, Kanagawa (JP); Yuko Shishido, Kanagawa (JP); Yuki Kurahashi, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 150 days.

(21) Appl. No.: 15/854,251

(22) Filed: Dec. 26, 2017

(65) Prior Publication Data

US 2018/0180774 A1 Jun. 28, 2018

(30) Foreign Application Priority Data

Dec. 28, 2016 (JP) .................................. 2016-255846

(51) Int. Cl.
*G02B 3/14* (2006.01)
*G02B 7/28* (2006.01)
*G02B 7/08* (2006.01)

(52) U.S. Cl.
CPC ................. *G02B 3/14* (2013.01); *G02B 7/08* (2013.01); *G02B 7/28* (2013.01)

(58) Field of Classification Search
None
See application file for complete search history.

(56) References Cited

U.S. PATENT DOCUMENTS

| | | | | |
|---|---|---|---|---|
| 2005/0041301 A1* | 2/2005 | Kibayashi | ................ | G02B 3/14 359/666 |
| 2009/0166426 A1* | 7/2009 | Giebel | ..................... | G02B 3/14 235/462.42 |
| 2010/0177376 A1 | 7/2010 | Arnold et al. | | |

* cited by examiner

*Primary Examiner* — William R Alexander
*Assistant Examiner* — Gary W O'Neill
(74) *Attorney, Agent, or Firm* — Greenblum & Bernstein, P.L.C.

(57) ABSTRACT

A variable focal length lens apparatus includes a lens system where a refractive index changes in response to an input drive signal; a field lens arranged on the same optical axis as the lens system; an image detector detecting an image of a measured object through the lens system and the field lens; a pulse illuminator providing pulse illumination of the measured object based on an input light emission signal; a temperature sensor detecting temperature information for an interior of the lens system; and a controller outputting the drive signal and the light emission signal in addition to correcting the timing of the light emission signal based on the temperature information.

5 Claims, 7 Drawing Sheets

VARIABLE FOCAL LENGTH LENS APPARATUS

CROSS-REFERENCE TO RELATED APPLICATIONS

The present application claims priority under 35 U.S.C. § 119 of Japanese Application No. 2016-255846, filed on Dec. 28, 2016, the disclosure of which is expressly incorporated by reference herein in its entirety.

BACKGROUND OF THE INVENTION

1. Field of the Invention

The present invention relates to a variable focal length lens apparatus.

2. Description of Related Art

As a variable focal length lens apparatus, an apparatus has been developed that uses a fluid lens system (hereafter referred to simply as "lens system") operating on a principle described by the specification of U.S. Published Patent Application No. 2010/0177376, for example. The lens system is formed by immersing in a transparent fluid a hollow cylindrical vibrating member formed of a piezoelectric material. In the lens system, when AC voltage is applied to both an inner circumferential surface and an outer circumferential surface of the vibrating member, the vibrating member expands and contracts in a thickness direction and causes the fluid on an inner side of the vibrating member to vibrate. By adjusting a frequency of the applied voltage in response to the natural frequency of the fluid, a standing wave of concentric circles is formed in the fluid and concentric circular regions having different refractive indexes are formed centered on a center axis line of the vibrating member. Therefore, in the lens system, when light transits along the center axis line of the vibrating member, the light travels along a path that either magnifies or reduces the light in accordance with the refractive index of each concentric circular region.

A variable focal length lens apparatus is configured by arranging the lens system described above and, for example, a field lens using an ordinary convex lens on the same optical axis. When parallel light strikes the ordinary convex lens, light passing through the lens comes into focus at a focal position that lies at a predetermined focal length. In contrast, when parallel light strikes the lens system arranged coaxially with the convex lens, the light is either magnified or reduced by the lens system and the light passing through the convex lens comes into focus at a position offset either farther away or closer than the original (state with no lens system) focal position. Accordingly, in the variable focal length lens apparatus, a drive signal (AC voltage of a frequency that generates a standing wave in the internal fluid) that is input to the lens system is applied, and by increasing or decreasing the amplitude of the drive signal, the focal position of the variable focal length lens apparatus can be controlled as desired within a set range (a predetermined amount of change allowing increase or decrease by the lens system, with the focal length of the field lens as a reference).

In the variable focal length lens apparatus, a sinusoidal AC signal is used as an exemplary drive signal that is input to the lens system. When such a drive signal is input, the focal length (focal position) of the variable focal length lens apparatus changes sinusoidally. In this case, when the amplitude of the drive signal is 0, the light transiting the lens system is not refracted and the focal length of the variable focal length lens apparatus is the focal length of the field lens. When the amplitude of the drive signal is at a positive or negative peak, the light transiting the lens system is maximally refracted and the focal length of the variable focal length lens apparatus is in a state having the greatest change from the focal length of the field lens. When an image is obtained using a variable focal length lens apparatus of this kind, a light emission signal is output to provide pulse illumination, synchronized with the phase of the sine wave of the drive signal. Accordingly, by providing pulse illumination in a state at a predetermined focal length, from among the sinusoidally changing focal lengths, the image of the measured object at the focal length is detected. Pulse illumination is performed at a plurality of phases that make up one period, and when image detection is performed in accordance with each phase, images at a plurality of focal lengths can be obtained simultaneously.

In the variable focal length lens apparatus described above, the temperature of the internal fluid or the vibrating member changes due to an influence of outside air temperature, heat produced in association with operation, or the like. Such changes may affect an internal vibrating state and also change a waveform described by the focal length. As a result, even though timing of the pulse illumination is the same, there is an issue such that an image having an abnormal focal length is detected. In addition, due to the change of the temperature of the internal fluid or the vibrating member, the frequency of the AC signal that produces the standing wave changes, and therefore, there is also an issue such that the focal length of the obtained image may be abnormal even when pulse illumination is provided under the same conditions.

SUMMARY OF THE INVENTION

The present invention provides a variable focal length lens apparatus that can obtain a detected image with a desired focal length even when the temperature of a fluid changes.

A variable focal length lens apparatus according to the present invention includes a lens system where a refractive index changes in response to an input drive signal; a field lens arranged on the same optical axis as the lens system; an image detector detecting an image of a measured object through the lens system and the field lens; a pulse illuminator providing pulse illumination of the measured object based on an input light emission signal; a temperature detector detecting temperature information for an interior of the lens system; and a controller outputting the drive signal and the light emission signal in addition to correcting the timing of the light emission signal based on the temperature information.

In the present invention, a sinusoidal AC signal (frequency that generates a standing wave in the lens system), for example, is input as the drive signal to the lens system from the controller, causing the refractive index of the lens system to fluctuate. Thereby, a focal position of the variable focal length lens apparatus is made to fluctuate at the surface of the measured object. In addition, the light emission signal is output by the controller at a specified phase having the drive signal as a reference, causing the pulse illuminator to emit light based on the light emission signal. Thereby, the image of the surface of the measured object at the focal length at the time of illumination can be guided through the field lens and the lens system toward the image detector, and can be detected as the detected image.

In this example, when the temperature of an internal fluid of the lens system changes and the focal length corresponding to the input drive signal changes, even though the phase of the drive signal (in other words, the timing of the light emission signal) is the same, the measured object is illuminated at an abnormal focal length, and an image at this abnormal focal length is unintendedly detected. However, in the present invention, the controller corrects the timing of the light emission signal based on the temperature information from the temperature detector, and therefore, the change of the focal length corresponding to the input drive signal can be obviated and an image with the desired focal length designated by the drive signal can always be detected.

In the variable focal length lens apparatus according to the present invention, the temperature detector preferably includes one of: a temperature sensor immersed in the internal fluid of the lens system, a temperature sensor attached to a vibrating member of the lens system, or a temperature sensor attached to a case of the lens system.

In the present invention, the temperature of the internal fluid of the lens system can be detected directly by the temperature sensor, and the temperature of the fluid itself can be used as the temperature information. Therefore, the controller can reliably correct the focal length with a simpler and more accurate configuration. Moreover, the temperature detector may be configured to detect the temperature indirectly based on an electrical parameter such as impedance or the like of the lens system, for example.

In the variable focal length lens apparatus according to the present invention, the controller preferably includes a correction function, or a correction value table in which a correspondence relationship between the temperature of the internal fluid of the lens system and a correction value of the focal length for the variable focal length lens apparatus is recorded ahead of time.

In the present invention, the correspondence relationship between the temperature of the internal fluid of the lens system and variation of the focal length is measured ahead of time, then the relationship can be stored as a data table of the fluid temperature and the correction value of the focal length, or the correction value of the focal length can be arranged as a function of the fluid temperature. By using the correction value table or the correction function, the temperature of the internal fluid of the lens system and the correction value to eliminate variation of the focal length can be obtained simply. Moreover, data on which the correction value is based is not necessarily limited to that which is measured piecemeal using the variable focal length lens apparatus, and correction value data that has been measured separately may be incorporated into another variable focal length lens apparatus.

According to the present invention, a variable focal length lens apparatus can be provided that can obtain a detected image with a desired focal length even when the temperature of a fluid changes.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Figure 1:
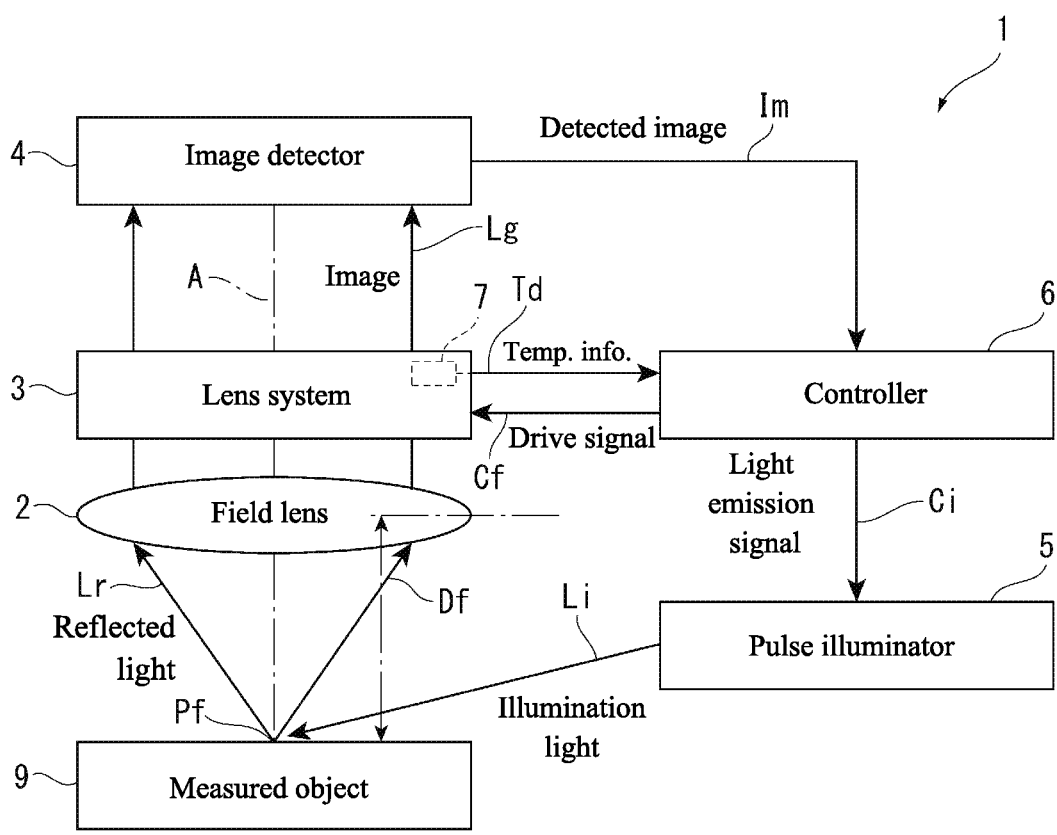
FIG. 1 is a block diagram illustrating a first embodiment of a variable focal length lens apparatus of the present invention.

In FIG. 1, in order to detect an image of a surface of a measured object (e.g., an object to be measured or a measurable object) 9 while varying a focal length, a variable focal length lens apparatus 1 is provided with a field lens 2, a lens system 3, and an image detector 4 all arranged on the same optical axis A that intersects with the surface. The variable focal length lens apparatus 1 further includes a pulse illuminator 5 providing pulse illumination of the surface of the measured object 9; a controller 6 controlling the pulse illuminator 5, the image detector 4, and the lens system 3; and a temperature sensor 7 installed on the lens system 3.

The field lens 2 is configured by a known convex lens. The image detector 4 is configured by a known charge coupled device (CCD) image sensor or some other form of camera, and can output to the controller 6 an incident image Lg as a detected image Im having a predetermined signal form. The pulse illuminator 5 is configured by a light emitting element such as a light emitting diode (LED), and when a light emission signal Ci is input from the controller 6, illumination light Li can be emitted for a predetermined amount of time and pulse illumination of the surface of the measured object 9 can be provided.

A refractive index of the lens system 3 changes in response to a drive signal Cf input from the controller 6. The drive signal Cf is a sinusoidal AC signal of a frequency that generates a standing wave in the lens system 3. In the variable focal length lens apparatus 1, a focal length Df to a focal position Pf can be changed as desired by changing the refractive index of the lens system 3 with the focal length of the field lens 2 as a reference.

Figure 2:
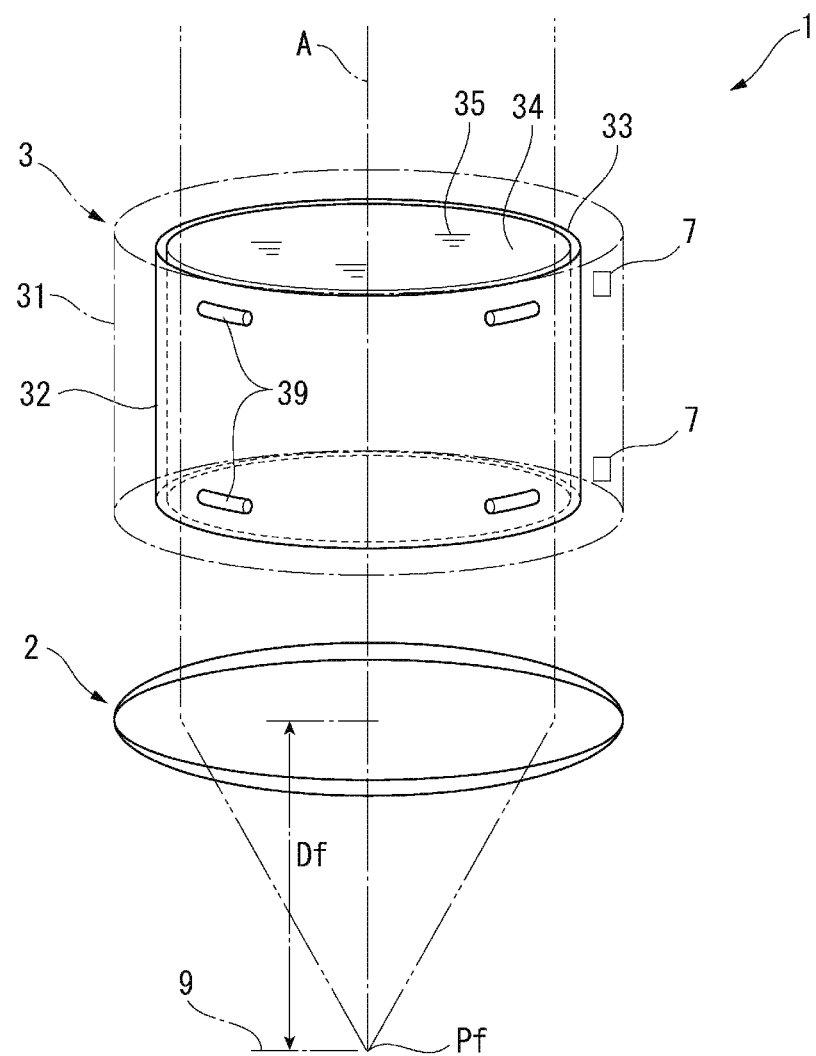
FIG. 2 is a perspective view illustrating a lens system according to the first embodiment.

In FIG. 2, the lens system 3 includes a hollow cylindrical case 31, and a hollow cylindrical vibrating member (also referred to as a "vibrator") 32 is installed on an interior of the case 31. The vibrating member 32 is supported by spacers 39 made of an elastomer that are disposed between an outer circumferential surface 33 of the vibrating member 32 and an inner circumferential surface of the case 31. The vibrating member 32 is a member having a piezoelectric material formed in a hollow cylindrical shape. The vibrating member 32 vibrates in a thickness direction due to an AC voltage of the drive signal Cf that is applied between the outer circumferential surface 33 and the inner circumferential surface 34. The interior of the case 31 is filled with a fluid 35 having high transparency, the entire vibrating member 32 is immersed in the fluid 35, and an inner side of the hollow cylindrical vibrating member 32 is filled with the fluid 35. The AC voltage of the drive signal Cf is adjusted to a frequency that generates a standing wave in the fluid 35 on the inner side of the vibrating member 32.

Figure 3:
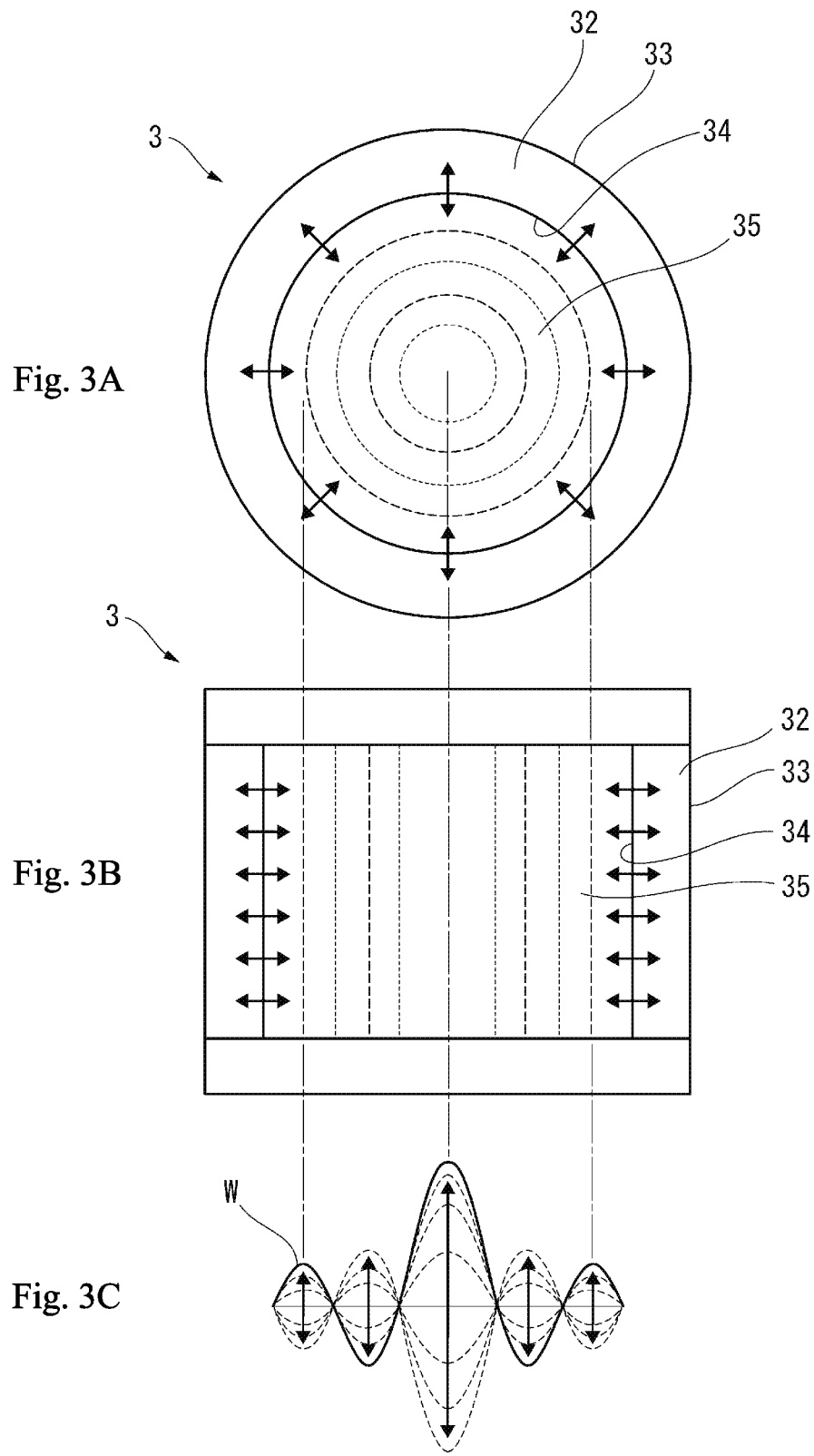
FIGS. 3A to 3C are schematic views illustrating operations of the lens system according to the first embodiment.
Figure 4:
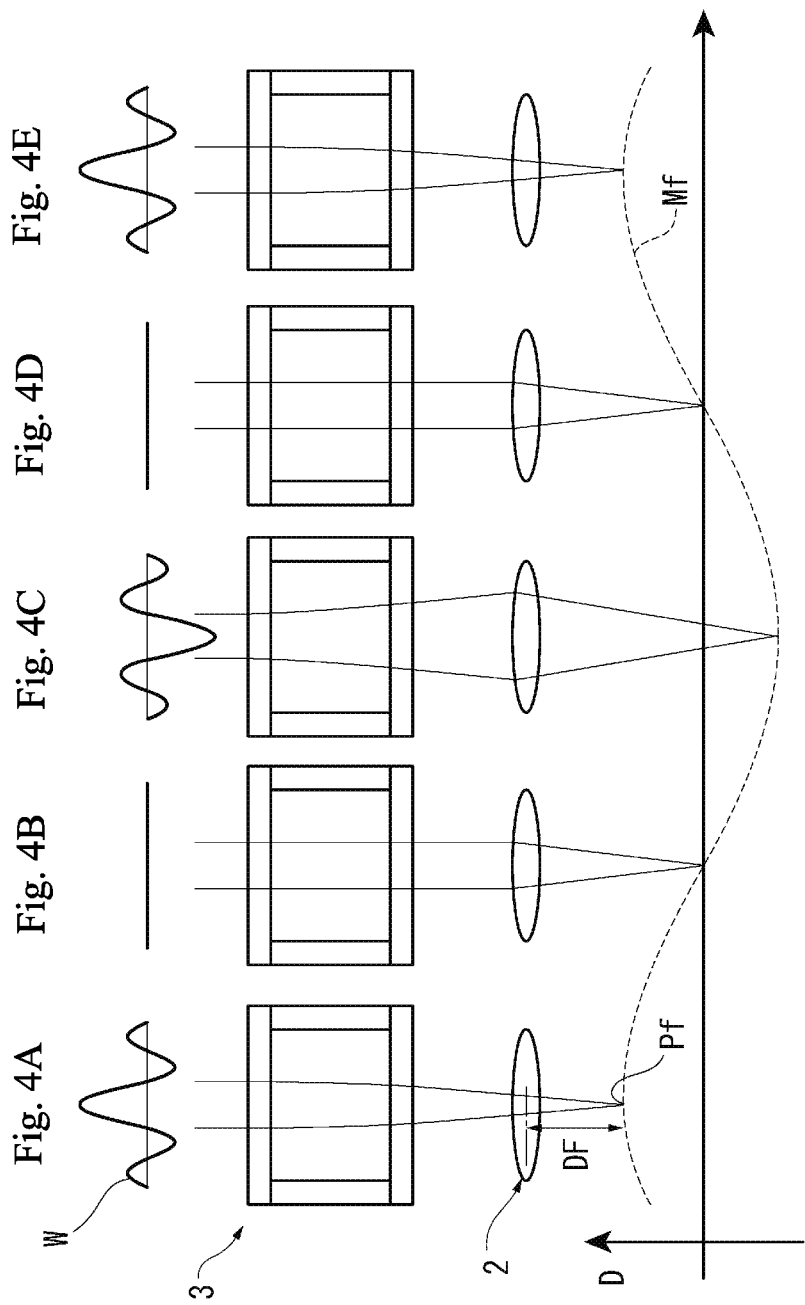
FIGS. 4A to 4E are schematic views illustrating a focal length of the lens system according to the first embodiment.

As shown in FIGS. 3A to 3C, in the lens system 3, when the vibrating member 32 is vibrated, a standing wave arises in the internal fluid 35 and concentric circular regions arise where the refractive index alternates (see FIGS. 3A and 3B). At this point, a relationship between a distance from a center axis line of the lens system 3 (radius) and the refractive index of the fluid 35 is as shown by a refractive index distribution W illustrated in FIG. 3C.

In FIGS. 4A to 4E, because the drive signal Cf is a sinusoidal AC signal, bands in the refractive index distribution W of the fluid 35 in the lens system 3 also change in accordance with the drive signal Cf. Also, the refractive index of the concentric circular regions that arise in the fluid 35 changes sinusoidally, and accordingly the focal length Df to the focal position Pf changes sinusoidally. In the state depicted in FIG. 4A, an amplitude of the refractive index distribution W is at its largest, the lens system 3 causes transiting light to converge, the focal position Pf is closer, and the focal length Df is at its shortest. In the state depicted in FIG. 4B, the refractive index distribution W is flat, the lens system 3 allows transiting light to transit unaffected, and the focal position Pf and the focal length Df are at standard values. In the state depicted in FIG. 4C, the amplitude of the refractive index distribution W is at its largest at the opposite pole from that of FIG. 4A, the lens system 3 causes transiting light to scatter, the focal position Pf is farther, and the focal length Df is at its maximum. In the state depicted in FIG. 4D, once again the refractive index distribution W is flat, the lens system 3 allows transiting light to transit unaffected, and the focal position Pf and the focal length Df are at standard values. The state depicted in FIG. 4E returns once again to the state depicted in FIG. 4A and similar fluctuations are repeated thereafter.

In this way, in the variable focal length lens apparatus 1, the drive signal Cf is a sinusoidal AC signal, and the focal position Pf and the focal length Df also fluctuate sinusoidally, as in a focal point fluctuation waveform Mf in FIGS. 4A to 4E. At this time, when pulse illumination is provided to the measured object 9 located at the focal position Pf at a desired point in time on the focal point fluctuation waveform Mf, an image is obtained of the focal position Pf at the focal length Df at the time of illumination.

Figure 5:
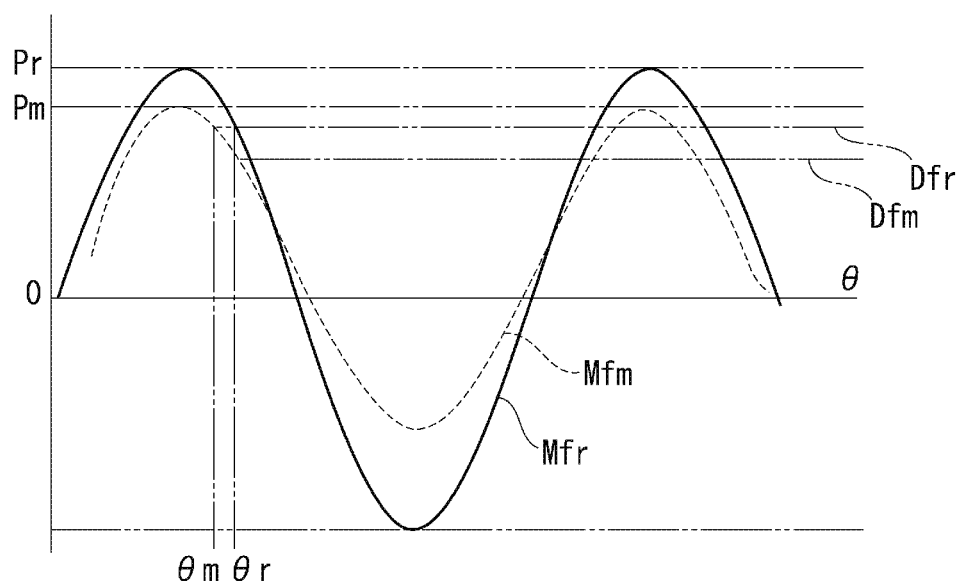
FIG. 5 is a graph illustrating fluctuation of a drive signal due to a temperature change according to the first embodiment.

Returning to FIG. 1, in the variable focal length lens apparatus 1, by illuminating the surface of the measured object 9 with the illumination light Li from the pulse illuminator 5 based on the light emission signal Ci input from the controller 6, reflected light Lr from the measured object 9 is sent to the image detector 4 through the field lens 2 and the lens system 3 and is detected as an image. In FIG. 5, when the light emission signal Ci, which is input to the pulse illuminator 5 from the controller 6, is set at a phase angle θr with respect to a focal point fluctuation waveform Mfr, the image obtained using the pulse illumination is the image of the surface of the measured object 9 at a focal length Dfr.

In this example, the temperature of the fluid 35 of the lens system 3 changes, thereby changing to a focal point fluctuation waveform Mfm. While the original focal point fluctuation waveform Mfr has a peak value Pr, the changed focal point fluctuation waveform Mfm has a peak value Pm having a smaller amplitude. When the light emission signal Ci stays at the phase angle θr with respect to this changed focal point fluctuation waveform Mfm, a focal length Dfm is created which deviates from the original focal length Dfr. As a result, a proper image of the surface of the measured object 9 at the focal length Dfr cannot be obtained. In response to such a change, the focal length Dfm can be returned to the original focal length Dfr by adjusting the light emission signal Ci to a phase angle θm with respect to the focal point fluctuation waveform Mfm. With this type of adjustment, the image of the surface of the measured object 9 at the focal length Dfr can be obtained properly.

In the present embodiment, to achieve this type of adjustment, the above-mentioned temperature sensor 7 (see FIG. 2) is installed on the lens system 3 and, in addition, the controller 6 is provided with a configuration to correct the timing of the light emission signal based on the temperature information from the temperature sensor 7.

In FIG. 2, one or more temperature sensors 7 are installed on the case 31. The temperature sensor 7 sends detected temperature information Td to the controller 6 and is attached to the outer circumferential surface of the vibrating member 32 or the inner circumferential surface of the case 31, or is supported between the outer circumferential surface of the vibrating member 32 and the inner circumferential surface of the case 31. In both cases, the temperature sensor 7 is immersed in the fluid 35 and is capable of detecting the temperature of the fluid 35. Installing the temperature sensor 7 on the inner side of the vibrating member 32 is to be avoided, so as not to interfere with the vibration of the fluid 35 from the vibrating member 32.

Figure 6:
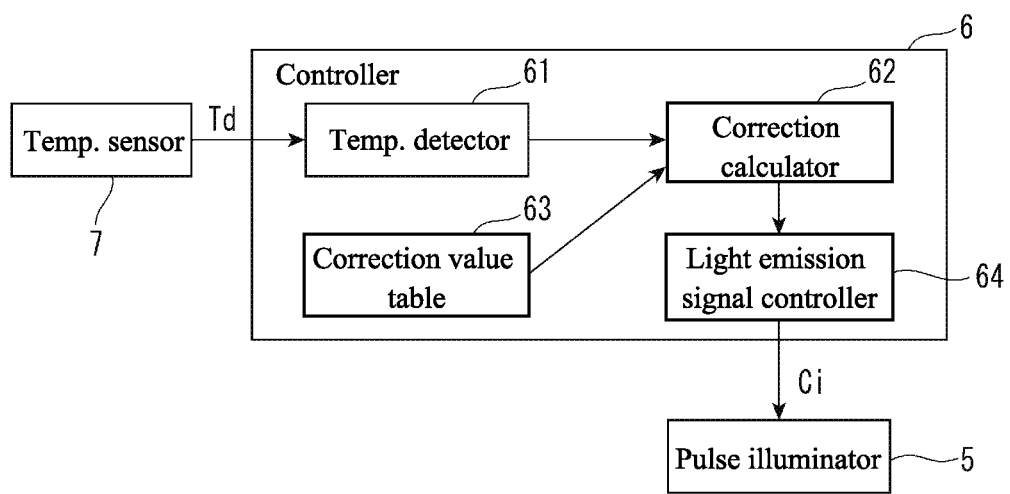
FIG. 6 is a block diagram illustrating relevant portions of a controller according to the first embodiment.

In FIG. 6, the controller 6 is provided with a temperature detector 61, a correction calculator 62, a correction value table 63, and a light emission signal controller 64. The temperature detector 61 processes the temperature information Td from the temperature sensor 7 and extracts the temperature information Td as the temperature information of the fluid 35. The correction calculator 62 refers to the correction value table 63 and corrects a phase angle θ of the light emission signal Ci according to the temperature information. The correction value table 63 stores data indicating the correspondence relationship between the temperature of the fluid 35 and the correction value of the phase angle θ of the light emission signal Ci. The light emission signal controller 64 outputs to the pulse illuminator 5 the light emission signal Ci of the phase angle θ corrected by the correction calculator 62.

In the present embodiment as described above, a sine wave, for example, is input as the drive signal Cf to the lens system 3 from the controller 6, causing the refractive index of the lens system 3 to fluctuate. Thereby, the focal position Pf (focal length Df) of the variable focal length lens apparatus 1 can be made to fluctuate sinusoidally at the surface of the measured object 9. In addition, the light emission signal Ci is output by the controller 6 at a specified phase angle θ having the drive signal Cf as a reference, causing the pulse illuminator 5 to emit light based on the light emission signal Ci. Thereby, the image Lg of the surface of the measured object 9 at the focal length Df at the time of illumination can be guided through the field lens 2 and the lens system 3 toward the image detector 4, and can be detected as the detected image Im.

In this example, when the temperature of the internal fluid 35 of the lens system 3 changes and the focal length Df corresponding to the input drive signal Cf changes (focal point fluctuation waveforms Mfr and Mfm, and focal lengths Dfr and Dfm in FIG. 5), so long as the timing of the light emission signal Ci (in other words, the phase angle θr with respect to the focal point fluctuation waveform Mfr) stays the same, the measured object 9 is illuminated at the different focal length Dfm, and an image at this abnormal focal length is unintendedly detected. However, in the present embodiment, based on the temperature information Td from the temperature sensor 7, the controller 6 corrects the timing of the light emission signal Ci to the proper timing (the phase angle θm with respect to the focal point fluctuation waveform Mfm), and therefore, the change of the focal length Dfm corresponding to the input drive signal Cf can be obviated and the image with the desired focal length Df designated by the drive signal Cf can always be detected.

In the present embodiment, the temperature sensor 7 is provided inside the lens system 3, and therefore, the temperature of the fluid 35 itself can be detected directly as the temperature information Td of the internal fluid 35 of the lens system 3 by the temperature sensor 7. Therefore, the controller 6 can reliably correct an error in the focal length Df caused by the temperature of the fluid 35 with a simpler and more accurate configuration.

In the present invention, the correspondence relationship, between the temperature of the internal fluid 35 of the lens system 3 and variation of the focal length Df, is measured ahead of time and stored in the correction value table 63 as a data table of the temperature of the fluid 35 and the correction value of the focal length Df. Therefore, the temperature of the internal fluid 35 of the lens system 3 and the correction value to obviate variation of the focal length Df can be obtained simply.

Second Embodiment

The present embodiment shares the basic configuration of the above-mentioned first embodiment, but a part of the configuration is different. Therefore, duplicated descriptions of the common portions are omitted below and the different portions are described. In the first embodiment described above, the temperature sensor 7 is installed inside the lens system 3 and, using the controller 6 illustrated in FIG. 6, the focal length Df corresponding to the temperature information Td is corrected, after which the properly timed light emission signal Ci is output to the pulse illuminator 5. In the present embodiment, by using a controller 6A illustrated in FIG. 7, a waveform of the drive signal Cf input to the lens system 3 is detected and a density of the internal fluid 35 of the lens system 3 is calculated from the frequency of the drive signal Cf, and thereby the temperature is detected indirectly.

Figure 7:
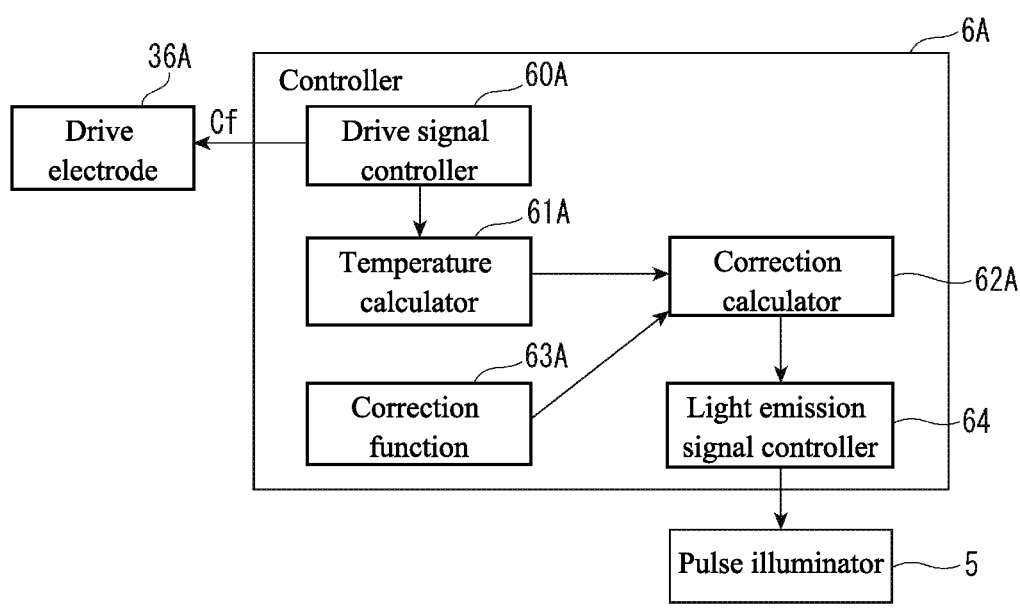
FIG. 7 is a block diagram illustrating relevant portions of a controller according to a second embodiment of the present invention.

In FIG. 7, the controller 6A includes a drive signal controller 60A, a temperature calculator 61A, a correction calculator 62A, a correction function 63A, and a light emission signal controller 64. The drive signal controller 60A outputs the drive signal Cf to a drive electrode 36A of the lens system 3. The drive electrode 36A is a pair of positive and negative electrodes formed on the outer circumferential surface 33 and the inner circumferential surface 34 of the hollow cylindrical vibrating member 32 according to the first embodiment described above.

A process of the drive signal controller 60A generating the drive signal Cf is similar to existing lens systems. For example, AC voltage of a predetermined initial frequency is applied to the lens system 3; the frequency is changed while monitoring the impedance thereof; the frequency at which the impedance is minimum is detected as a natural frequency of the lens system 3; and the AC voltage with this frequency becomes the drive signal Cf. Such frequency setting is always performed automatically by the drive signal controller 60A while in operation. In this example, when the natural frequency of the lens system 3 changes due to the temperature change of the fluid 35 of the lens system 3, the drive signal controller 60A causes the frequency of the AC voltage (the drive signal Cf) to follow suit. Accordingly, based on the frequency of the drive signal Cf set by the drive signal controller 60A, the temperature change of the fluid 35 of the lens system 3 can be detected.

The temperature calculator 61A monitors the drive signal controller 60A mentioned above and detects the temperature change of the fluid 35 of the lens system 3 based on the frequency of the drive signal Cf set by the drive signal controller 60A. The correction calculator 62A refers to the correction function 63A and corrects the phase angle θ of the light emission signal Ci in response to the temperature information obtained by the temperature calculator 61A. The correction function 63A stores a function indicating the correspondence relationship between the temperature of the fluid 35 and the correction value of the phase angle θ of the light emission signal Ci. The light emission signal controller 64 outputs to the pulse illuminator 5 the light emission signal Ci of the phase angle θ corrected by the correction calculator 62A.

According to the second embodiment above, a similar effect as in the first embodiment described above can be obtained. In the second embodiment, the temperature sensor 7 described in the above-mentioned first embodiment is not used, and therefore, the configuration can be simplified. In particular, adding an apparatus and the like to the lens system 3 is not required and there is no interference with the surroundings, either.

OTHER EMBODIMENTS

In the various embodiments mentioned above, the correspondence relationship, between the temperature of the internal fluid 35 of the lens system 3 and variation of the focal length Df, is measured ahead of time, then is provided as the correction function 63A or as the correction value table 63 indicating the relationship between the temperature of the fluid 35 and the correction value of the focal length Df. In contrast, the data on which the correction value is based is not necessarily limited to that which is measured piecemeal using the variable focal length lens apparatus 1, and the correction value data that has been measured separately may be incorporated into another variable focal length lens apparatus 1. In addition, the correction data may be stored as software (or a portion thereof) in the controller 6 or a storage device (not shown).

Additionally, in the various embodiments described above, the drive signal Cf and the focal point fluctuation waveform Mf are configured to be sine waves. However, the drive signal Cf and the focal point fluctuation waveform Mf may instead be triangular waves, saw-tooth waves, rectangular waves, or some other waveform. The specific configuration of the lens system 3 may be modified as appropriate. Instead of having a hollow cylindrical shape, the case 31 and the vibrating member 32 may have a hollow hexagonal shape, for example. The specific configuration of the controllers 6 and 6A can be selected as appropriate for the application.

The present invention can be used in a variable focal length lens apparatus.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A variable focal length lens apparatus comprising:
   a lens system wherein a refractive index changes in response to an input drive signal;
   a field lens arranged on the same optical axis as the lens system;
   an image detector that detects an image of a measurable object through the lens system and the field lens;
   a pulse illuminator that provides pulse illumination of the measurable object based on an input light emission signal;
   a temperature detector that detects temperature information for an interior of the lens system; and
   a controller that
      outputs the drive signal and the light emission signal, and corrects the timing of the light emission signal and a phase angle with respect to a focal point fluctuation waveform based on the temperature information.

2. The variable focal length lens apparatus according to claim 1, wherein the temperature detector includes one of: a temperature sensor immersed in an internal fluid of the lens system, a temperature sensor attached to a vibrator of the lens system, and a temperature sensor attached to a case of the lens system.

3. The variable focal length lens apparatus according to claim 1, wherein the controller includes one of a correction function and a correction value table, in which a correspondence relationship between the temperature of the internal fluid of the lens system and a correction value of a focal length for the variable focal length lens apparatus is recorded prior to changing the refractive index of the lens system.

4. The variable focal length lens apparatus according to claim 2, wherein the controller includes one of a correction function and a correction value table, in which a correspondence relationship between the temperature of the internal fluid of the lens system and a correction value of a focal length for the variable focal length lens apparatus is recorded prior to changing the refractive index of the lens system.

5. The variable focal length lens apparatus according to claim 1, wherein a change of the focal length corresponding to an input drive signal is obviated and an image with a desired focal length designated by the drive signal is detected.

* * * * *